United States Patent [19]

Smith

[11] Patent Number: 5,758,548
[45] Date of Patent: Jun. 2, 1998

[54] BICYCLE HANDLEBARS

[76] Inventor: Eugene W. Smith, P.O. Box 1856, Lowell, Mass. 01853

[21] Appl. No.: 673,303

[22] Filed: Jun. 28, 1996

[51] Int. Cl.⁶ .................................................. B62K 21/12
[52] U.S. Cl. .................................... 74/551.1; 74/551.8
[58] Field of Search ............................ 74/551.1–551.8; 280/279, 280

[56] References Cited

U.S. PATENT DOCUMENTS

| | | | |
|---|---|---|---|
| D. 236,711 | 9/1975 | Michael | D12/11 |
| D. 323,805 | 2/1992 | Giard, Jr. | D12/178 |
| 4,708,357 | 11/1987 | Soderbaum | 280/289 H |
| 4,750,754 | 6/1988 | Lennon | 280/261 |
| 4,878,397 | 11/1989 | Lennon | 74/551.1 |
| 5,133,224 | 7/1992 | Prins | 74/551.3 |
| 5,138,893 | 8/1992 | Copeland | 74/551.1 |
| 5,197,350 | 3/1993 | Borromeo | 74/551.8 |
| 5,209,508 | 5/1993 | Lennon | 280/261 |
| 5,235,872 | 8/1993 | Giard, Jr. | 74/551.8 |
| 5,265,496 | 11/1993 | Townsend | 74/551.8 |
| 5,285,696 | 2/1994 | Taylor | 74/551.1 |
| 5,319,994 | 6/1994 | Miller | 74/551.8 |
| 5,390,564 | 2/1995 | Klieber | 74/551.1 |
| 5,427,286 | 6/1995 | Hagerty | 224/42.03 B |
| 5,429,013 | 7/1995 | Taylor et al. | 74/551.1 |
| 5,580,152 | 12/1996 | Carter | 74/551.8 X |

FOREIGN PATENT DOCUMENTS

| | | | |
|---|---|---|---|
| 3628649 | 3/1988 | Germany | 74/551.1 |
| 4336485 | 6/1994 | Germany | 74/551.1 |
| 4-143185 | 5/1992 | Japan | 74/551.8 |
| WO 91/04903 | 4/1991 | WIPO | 74/551.1 |
| WO 95/29090 | 11/1995 | WIPO | 74/551.8 |

*Primary Examiner*—Vinh T. Luong
*Attorney, Agent, or Firm*—Pearson & Pearson

[57] ABSTRACT

Bicycle handlebars and handlebar attachments to provide multiple hand grips when a rider assumes different postures. The handlebars and attachments define three auxiliary hand grip positions. A first auxiliary gripping portion extends forward from a conventional handlebar parallel to a vertical, central common plane and inclined upwardly. A second auxiliary gripping portion parallels the conventional handlebars. A third auxiliary gripping portion parallels the common plane, lies below the handlebars and parallels the first auxiliary portion.

30 Claims, 3 Drawing Sheets

BICYCLE HANDLEBARS

BACKGROUND OF THE INVENTION

1. Field of the Invention

This invention relates to bicycles and more particularly to bicycle handlebars.

2. Description of Related Art

Bicycles are of two basic types: (1) "road" or "racing" type bicycles and (2) "mountain" or "all terrain" bicycles. Each has unique design objectives. The underlying design objective for road bicycles is speed over smooth roads, tracks and the like. To meet this objective road bicycles have thin tires and large radius wheels to minimize rolling friction. The handlebars have dropped or lowered, closely spaced gripping surfaces that facilitate the rider's attaining an aerodynamic posture that enables good power transmission from the rider of the bicycle through the pedals.

The underlying design objective for mountain or all terrain bicycles is stability. These bicycles operate on various off-road surfaces including sand, gravel, rock, mud or snow. All terrain bicycles seek to meet this objective by using smaller diameter wheels and thicker or wider tires that are inflated to lower pressures than for the corresponding road bicycle tires. The tires provide some shock absorbing or cushioning effect, allow greater traction in loose surfaces and spread the weight of the bike and rider and other gear supported by the tire over a greater surface area for riding in soft surfaces such as mud. To enable the rider to operate the bicycle on these various surfaces, the handlebars extend laterally from the goose neck a greater distance than a road bike and generally do not include dropped gripping surfaces proximate the goose neck. This improves the rider's leverage for controlling the bicycle. However, these handlebars do not provide a gripping surface that enables the rider to assume an aerodynamic position for reducing wind resistance. In truly off-road situations, this extra effort is generally not a problem because air resistance is just not an issue to overcome.

However, many all terrain bicycle riders do not confine themselves to off-road bicycle use. In fact many riders ride all terrain bicycles like road bicycles, apparently preferring the increased riding comfort provided by the suspension and tires of the all terrain vehicle. Moreover, handlebars do not force the bicyclist to stretch constantly into a low, aerodynamic seating riding posture. Additionally, all terrain bicycles have become a "cycle touring" bicycle. In cycle touring the rider carries camping gear, clothing, food and other paraphernalia as the rider cycles from campsite to campsite. The added weight of this paraphernalia introduces stresses a road bike does not accommodate. For instance the tire compression due to the added weight results in a harsh ride; minor road hazards can produce flat tires, bent rims or, in extreme cases, wheel collapses; other forces can produce even more extensive damage to a road bicycle. All terrain and road bicycles generally have different gearing. Low gearing, essential for climbing steep grades that may be encountered in off-road riding and the like, is not generally found in road bicycles, except for the more expensive road touring bicycles.

With this background, it will be apparent that a real need has developed for an all terrain vehicle that has many characteristics of a road bike. That is, a need exists for a bicycle having both on-road and off-road performance characteristics that enable a rider to ride in a variety of conditions without substantial sacrifice to the performance of such bicycle on a road. Specifically there is a need for a bicycle that provides road bike performance when riding on a road and all terrain performance when riding off the road.

The following United States Letters Patent disclose various handlebars and handlebar kits for bicycles that attempt to provide different handlebar positions for allowing a rider to assume different postures:

Des. 323,805 (1992) Giard, Jr.
4,750,754 (1988) Lennon
4,878,397 (1989) Lennon
5,133,224 (1992) Prins
5,138,893 (1992) Copeland
5,209,508 (1993) Lennon
5,235,872 (1993) Giard, Jr.
5,319,994 (1994) Miller United States Design Pat. No. DES.323,805 to Giard, Jr. discloses a bicycle handlebar with first portions that extend forward from a goose neck at a vertical position near the top of the goose neck and rearwardly extending second portions that form gripping portions below and outside the first portions. The different hard grip portion allows the rider to assume a normal upright posture or an aerodynamic posture.

Each of U.S. Pat. Nos. 4,750,754 and 4,878,397 discloses a bicycle handlebar with a crosspiece forward of a steering post axis and gripping portions located forward of the crosspiece. The forward portions are relatively closely spaced. When a rider grips these forward portions, the rider presents a minimal frontal area posture on the bicycle.

U.S. Pat. No. 5,133,224 to Prins discloses a bicycle handlebar that is adjustable about two axes. A U-shaped member is fixed to a steering post and is rotatable at the post or goose neck in a conventional fashion. An axle attaches to the extending ends of the U-shaped member and carries hand grips. The hand grips are selectably rotatable about the axle so there are two parallel axes of rotation. This structure enables a rider to readily adjust the handlebars between a racing position and a touring position.

U.S. Pat. No. 5,138,893 to Copeland discloses a hand grip adapter system or kit for attachment to a bicycle handlebar which provides closely spaced hand grips positioned below and in front of a normal bicycle handlebar cross piece. The hand grips comprise a pair of tubular members having clamps at one end that attach to the cross piece. The tubular members extend forward and downward from the cross piece. An end portion curves down and back to provide a gripping surface. A rider uses those hand grips in an aerodynamic posture and uses conventional hand grips when maximum riding speed is not needed.

U.S. Pat. No. 5,209,508 to Lennon discloses bicycle handlebars that provide a hand grip below a handlebar cross piece attached to a conventional goose neck. The lower hand grip can be included in new handlebars or as part of an add on kit. These hand grips preferably extend from the lowered grips of conventional drop racing handles inwardly towards the plane of the front wheels and parallel to the cross piece. The rider grasps the lower hand grips for an aerodynamic posture; otherwise the rider grasps the lower grips of the conventional drop handlebar.

U.S. Pat. No. 5,235,872 to Giard, Jr. discloses bicycle handlebars with first widely spaced gripping portions extending in a lower plane and forwardly relative to lateral members. Second gripping portions are defined by leg portions of open loop structures secured to the lateral members proximate the goose neck. The handlebars also include arm rests for receiving the operator's forearms while gripping the closely spaced leg portions of the loop.

U.S. Pat. No. 5,319,994 to Miller discloses a handlebar attachment that permits a rider to assume an improved aerodynamic position while riding. The attachment includes hand area elements, sliding elements and joint elements for joining the hand area element and sliding elements together.

Using any of the foregoing devices on an all terrain bicycle will enhance its performance and/or versatility by introducing some road bicycle features related to aerodynamics. For example the devices disclosed by Lennon in U.S. Pat. Nos. 4,750,754 and 4,878,397, which are representative of a "loop style" replacement handlebars, allow a rider on an all terrain bicycle to obtain a slightly more aerodynamic position than can be achieved using standard equipment. However, the position still is not low enough to enable a rider to assume the low aerodynamic posture of a road bike rider as a rider's elbows still tend to protrude from the body.

Loop style bars also are not compatible with many of the currently used shifting and braking mechanisms. Likewise, others of the disclosed devices do not enable optional aerodynamic positioning or ease of use.

The previously discussed Giard, Jr. U.S. Pat. No. 5,235,872 is representative of a wide variety of specialized "aerodynamic" handlebar adapters intended for road racing that may be bolted to an all terrain bicycle handlebar. However, these devices tend to weigh over a pound and add weight to the all terrain bicycle, off-setting their value. Other handlebar conversion devices require a rearrangement of other equipment such as brake grips and/or gear shift levers.

Thus the current art lacks a handlebar kit with easy attachment to a standard handlebar of an all terrain bicycle such that a single bicycle becomes capable of being adapted to perform well in off-road, touring and on-road conditions. The art further fails to disclose handlebars that are suited for all uses to which an all terrain bicycle may be used including particularly both on-road and off-road riding.

SUMMARY

It is therefore an object of this invention to provide bicycle handlebars that have a plurality of gripping surfaces suited for different rider positions.

It is another object of this invention to provide a bicycle handlebar that is easy to install and remove.

It is still another object of this invention to provide a handlebars for attachment to an existing bicycle handlebar to provide at least one additional gripping surface for a rider.

It is yet another object of this invention to provide handlebar attachments and handlebars that facilitate riding a bicycle in both on-road and off-road conditions.

It is yet still another object of this invention to provide handlebars that facilitate riding a bicycle in a plurality of postures.

It is still yet another object of this invention to provide a bicycle that provides a rider with at least four hand grips.

In accordance with one aspect of this invention, a handlebar attachment connects to a handlebar on a bicycle wherein the bicycle handlebar extends along a nominally horizontal axis and includes one hand grip area. A coupling connects the handlebar attachment to the bicycle handlebar. A first auxiliary grip portion on the handlebar attachment extends from the coupling in a plane through the axis for forming another hand grip. A second auxiliary grip portion extending toward the other end of the bicycle handlebar forms another hand grip. A third auxiliary grip portion nominally parallel to the first auxiliary grip portion and below the axis forms another hand grip. Other portions of the handlebar position the first, second and third auxiliary grip portions whereby the bicycle handlebar and the handlebar attachment provide a plurality of hand grips that enable a rider to assume a range of postures on the bicycle.

In accordance with another aspect of this invention, a bicycle with front and rear wheels, a frame lying along a common plane for supporting the wheels and a steering structure for rotating the front wheel for steering includes first and second handlebars. Each handlebar includes a central handlebar portion extending from the steering structure along an axis from the common plane for forming a first hand grip. A first auxiliary grip portion extends from the central handlebar portion in a plane through the axis for forming another hand grip. A second auxiliary grip portion extends in a direction substantially parallel to the axis and toward the common plane to a position spaced therefrom for forming another hand grip. A third auxiliary grip portion extends in a direction substantially parallel to the first auxiliary portion and below the axis for forming another hand grip. Each handlebar also includes structure for positioning the first, second and third auxiliary grip portions relative to the central handlebar portion thereby to provide a plurality of grip areas for a rider for use in different rider postures on the bicycle.

BRIEF DESCRIPTION OF THE DRAWINGS

It is intended that the appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
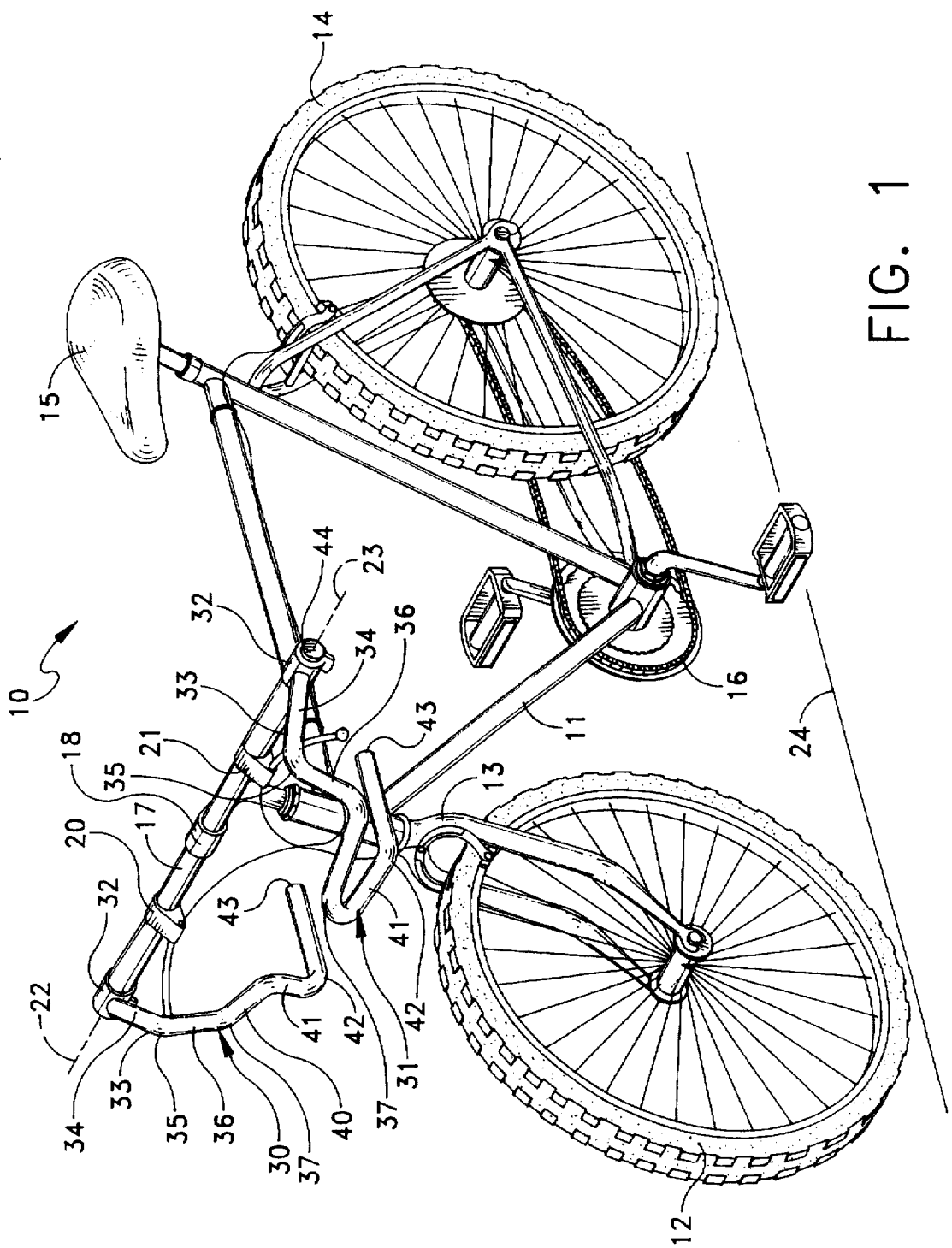
FIG. 1 is a perspective view of a bicycle including a handlebar kit according to this invention.

FIG. 1 depicts an all-terrain bicycle 10 that includes a frame 11, a front wheel 12 carried by a fork 13 and a rear wheel 14. The frame 11, front wheel 12 and rear wheel 14 lie along a common plane that is vertical when the bicycle 10 is upright. The frame 11 supports a seat 15 and a pedal crank mechanism 16. A rider steers the bicycle by rotating a conventional bicycle handlebar 17 that typically supports brake mechanisms 20 and 21. The handlebars 17 connect to the fork 13 by means of a goose neck 18 that the frame 11 supports. When the front wheel is positioned in the common plane, the handlebars 17 extend along nominally horizontal axes 22 and 23 that may be normal to the common plane, represented in FIG. 1 as a line through the front and rear wheels 12 and 14 or skewed horizontally toward the rear wheel by up to about 9° and typically in the range of 3° to 9°. The handlebars 17 on such an all terrain or off-road bicycle 10 normally provide a rider with only one position for gripping the handle bars 10 whatever the posture the rider wants to adopt.

Still referring to FIG. 1 and in accordance with this invention, the bicycle 10 is modified by adding handle bar attachments 30 and 31 that provide, in this particular embodiment, with three auxiliary gripping portions and hand grips that enable the rider to select one hand grip according to the posture the rider wants to adopt. Each of the handle bar attachments 30 and 31 has an identical structure so in the following description like reference numerals denote corresponding elements of those handlebar attachments 30 and 31. More specifically, clamps 32 fix the handle bar attachments 30 and 31 to the ends of the handlebars 17. First auxiliary gripping portions 33 extend from the clamps 32 in a direction generally perpendicular to and forward of the handle bars 17 to define a first hand grip 34 that a rider can grasp with relative ease in a standing position.

The gripping portion 33 as well as other portions of each of the handlebar attachments 30 and 31 can comprise a tubular structure of metal, resin impregnated fiberglass, carbon fiber or like material that is bent, formed or molded into appropriate shapes. In an alternative version the different portions might comprise coupling members that would position the gripping portions in appropriate locations by welding, telescoping or mechanically clamping, although the bent tubular structure is the preferred version. As will become apparent, the final structure of one of the handle bar attachments 30 and 31 will comprise gripping portions like the gripping portion 33 and positioning portions formed by bends in the tubular structure or coupling devices that position the different gripping portions appropriately.

One such positioning portion extends from the forward end 35 of the first gripping portion 33 to form a link 36 that extends downwardly and essentially perpendicularly to a plane defined by the first auxiliary gripping portion 33 and the corresponding one of the handlebar axes 22 or 23, or along some other direction to position a second auxiliary gripping portion 37. The gripping portion 37 extends generally parallel to the corresponding handle bar axis 22 or 23 to provide a hand grip area 40 for being grasped by the rider with the hands extending over the handlebars 17 to provide gripping surface for the rider in a forward leaning sitting position.

Additional positioning structure in the form of a link 41 defines the position of a third auxiliary gripping portion 42 that forms a hand grip area 43. The gripping area 43 extends generally parallel along a direction that is typically parallel to the vertical common plane extending through the line 24, to lie intermediate the common plane and the end of the handlebar to which the handlebar attachment connects. This provides a front to back gripping surface lying below the handlebars 17 that the rider can grasp with his arms under the handlebars 17 to assume a tucked aerodynamic position and that will naturally allow a posture in which the rider's arms are tucked within an area that is less than the width of the body.

With this as background it will be possible to understand some of the details of the construction of the handlebar attachments 30 and 31 shown in FIG. 1. More particularly, FIGS. 2 through 4 are plan views that depict constructional details of one embodiment of this invention that is constituted by an integral structure formed of bent tubing.

Figure 2:
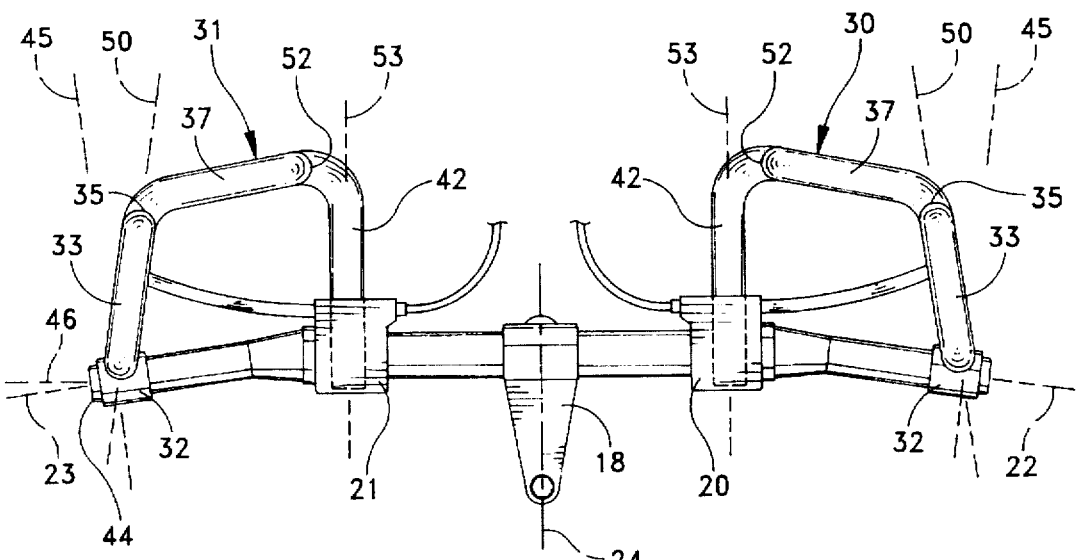
FIG. 2 is a top view of the handlebars of FIG. 1.
Figure 3:
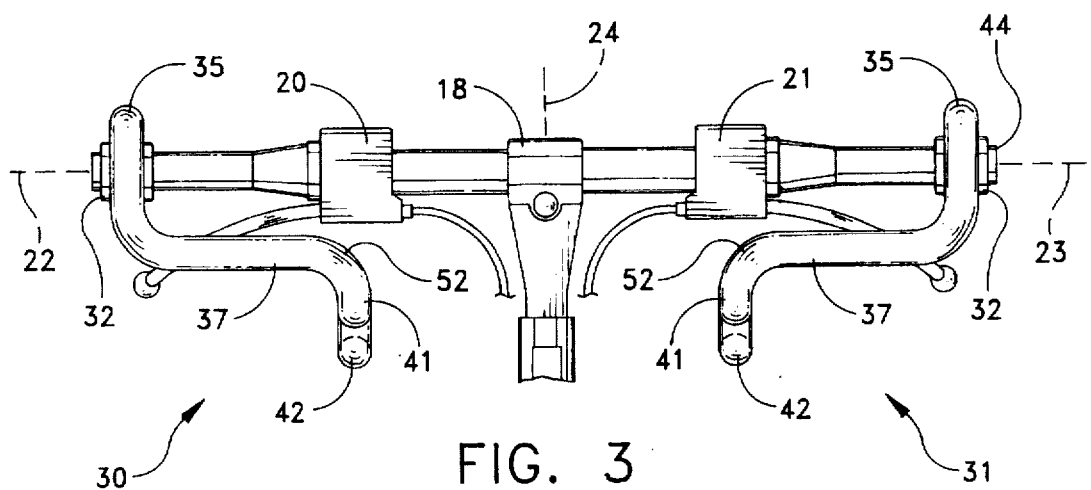
FIG. 3 is a front view of the handlebars of FIG. 1.
Figure 4:
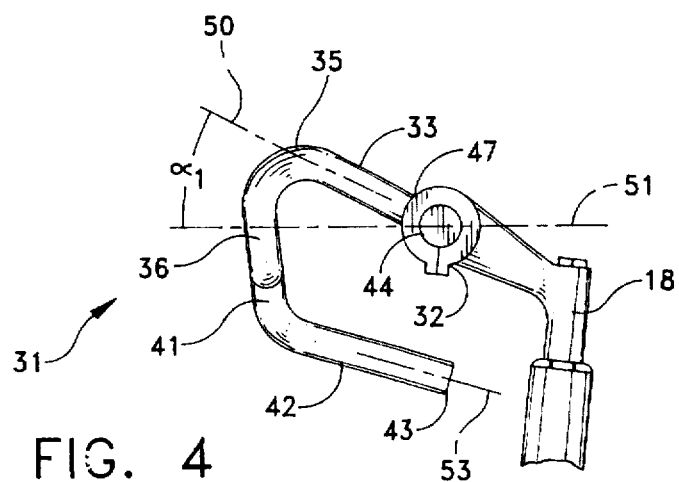
FIG. 4 is a left side view of the handlebars of FIG. 1.

Starting at the attachment to the handlebars 17, shown in phantom in FIGS. 2 through 4, each of the handlebar attachments 30 and 31 includes the clamp 32. In FIG. 4, particularly, the clamp 32 is shown as comprising a split clamp that, as known, clamps onto the handlebar by tightening a fastener (not shown) as for example at the left end 44 as shown in FIGS. 2 and 3. Generally the clamp 32 lies along an axis 45 that is perpendicular to the axis 23 and therefore will have a skew with respect to the common plane 24 through the front and rear wheels 12 and 14 that equals the skew of the axis 23 relative to an axis 46 that is normal to the common plane 24. As previously indicated the skew is typically between 3° and 9°. Typically the clamp 32 has a weld joint 47, as shown in FIGS. 2 and 4, to a tubular portion of the attachments 30 and 31. The fundamental design criteria of the clamp 41 is having sufficient strength to hold the attachments 30 and 31 in position on the handle bar 17 under normal riding conditions given downward or upward pressure placed on the handlebar attachments by the rider.

The first auxiliary gripping portion 33, extends from the weld joint 47 as shown in FIGS. 2 and 4 along an axis 50 shown in FIG. 4 that intersects the corresponding one of the axes 22 or 23. FIG. 4 additionally depicts an horizontal axis 51 that intersects the axis 50 in the center of the handlebars 17. This angle a can be adjusted by positioning the clamp to any angle above the horizontal axis 51. Typically the angle $\alpha=30°\pm10°$.

The first auxiliary portion 33 extends between the weld joint 47 and the forward end 35 constituted by a bent portion of the tube. The distance between the weld joint 47 and the forward end 35 is selected to allow a rider to grasp the first auxiliary portion 33. Typically a length of about 4" would be satisfactory. Typically the axis 50 will as shown in FIG. 2 make an angle with respect to the axis 45 that corresponds to the angle between the axes 23 and 46 so that the first auxiliary gripping portion 33 generally will be parallel to the common plane. In this configuration, each of the handlebar attachments 30 and 31 positions the first auxiliary gripping portion 33 forward and above the bicycle handlebars 17. As previously indicated, in this position the rider's hands will naturally grasp the first auxiliary portion 33 when the rider is standing on the pedal mechanism 16 shown in FIG. 1 or is in an upright seated posture.

The link 36 extends from the end 35 downwardly to a position at or slightly below the axis 51 shown in FIG. 4. The tube is then bent at approximately right angles to direct the second auxiliary portion 37 in a generally horizontal plane inwardly toward the common plane 24 and approximately parallel to the handlebar 17. As an alternative the second auxiliary portion 37 could be rotated in the horizontal plane so that a free end could displace the link to lie in a non-parallel relationship with respect to the handlebar 17. Generally the second auxiliary gripping portion 37 will also have a length that will accommodate the majority of human hands. Consequently the free end 52 will be spaced with respect to the common plane 24 and lie intermediate the common plane 24 and the end 35 of the first auxiliary gripping portion 33.

From the ends 52, the tubular member is bent to form the second downwardly extending link 41 that positions the third auxiliary gripping portion 42. In addition, an axis 53 through the third auxiliary gripping portion 42 will lie generally parallel to the common plane 24 and parallel to the axis 50. Any inclination of the first auxiliary portion 33 is replicated by the third auxiliary portion 42 although the third auxiliary portion 42 will be offset and intermediate the first auxiliary portion 33 and the central common plane 24. Again, this angle will typically be 30°±10° with respect to the horizontal in the vertical plane as shown in FIG. 4. When a rider grips the third auxiliary gripping portion 42, the arms will extend under the handlebars 17 and allow the rider to assume an aerodynamic posture with the arms tucked within an area that is less than the width of the body.

It will become evident that the handlebar attachments 30 and 31 therefore can be constructed of bent tubing as previously disclosed or by other methods. Each of the bends and links like the free ends 35 and 52 including the links 36 and 41, are formed of angles and lengths that properly locate or position each of the auxiliary gripping portions at an appropriate location. Collectively they constitute a means for establishing the relative positions of the first, second and third auxiliary grip portions 33, 37 and 42. Where customization becomes important, links, such as links 36 and 41, might be constructed with slip joints such that the relative height of the auxiliary portions 37 and 42 could be adjusted. Construction using other coupling methods might also be undertaken. Any or all of these embodiments provides a handlebar that has the capability of permitting a number of gripping surfaces to be located in the best position for different rider postures.

The use of a clamping structure such as represented by the clamp 32 can be varied for producing other attachment mechanisms for connecting handlebar attachments 30 and 31 to the handlebars 17. As will also be apparent, it is possible to manufacture an integral structure that incorporated the handlebars 17 and the auxiliary gripping portions 33, 37 and 42 in a single handlebar assembly for direct connection to a bicycle. The integral handlebar structure would, obviously, eliminate the structures corresponding to the clamps 32.

Figure 5:
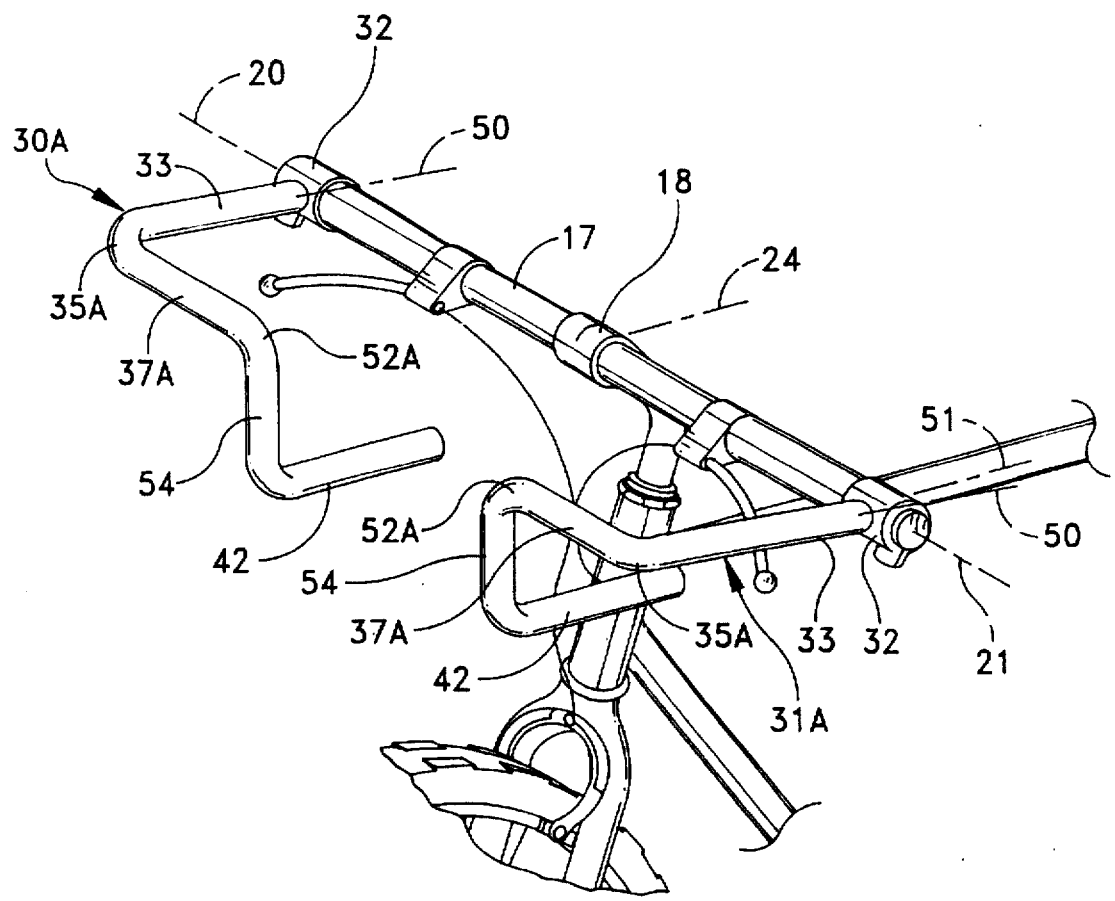
FIG. 5 is a perspective view of another embodiment of this invention.

FIG. 5 depicts an alternate embodiment of a handlebar in accordance with this invention that also provides three auxiliary gripping areas but uses a different positioning structure or means to locate the second auxiliary gripping portion differently from the embodiment shown in FIGS. 1 through 4. In FIG. 5 like reference numerals will show elements that correspond to like elements in FIGS. 1 through 4, modified elements will be designated by the same reference numeral adding the suffix "A".

More specifically, the handlebars 17 in FIG. 5, like the handlebars in FIGS. 1 through 4, extend along axes 20 and 21 that may be co-linear or be skewed with respect to the vertical common plane 24. The right and left attachments 30A and 31A each comprise a clamp 32 that attaches to the ends of the bicycle handlebar 17. A first auxiliary gripping portion 33 extends from the clamp 32 and is normally located to be parallel to the common plane 24 and to extend forwardly and be inclined upwardly with respect to a horizontal axis 51 at an angle of 30°±10°. Whereas in FIGS. 1 through 4 the free end 35 of the first auxiliary portion services as a transition to a downward link, in the embodiment shown in FIG. 5 a free end 35A of the gripping portion 33 constitutes a bend that produces the second auxiliary gripping portion 37A that is parallel to the bike axes 20 and 21. However in this particular embodiment the second auxiliary gripping portion 37A lies in a plane defined by the respective one of the axes 20 and 21 and the axis 50 through the first auxiliary gripping portions 33. Consequently whereas the link 36 acts as a means for establishing the relative position of the second auxiliary gripping portions 37 in FIGS. 1 through 4 to lie slightly below the axis 51, the corresponding positioning means in FIG. 5 position second auxiliary gripping portions 37A to lie above the axis 51.

Still referring to FIG. 5 and to the inner end 52A of the second auxiliary gripping portion 37A, a link 54 extends downwardly by a distance corresponding to the total distance of the links 36 and 41 in FIGS. 1 through 4. The link 54 terminates with a bend that aligns the third auxiliary gripping portion 42 below the handlebar axis, parallel to the common plane 24 and parallel to the axis 50 and the first gripping portions 33.

This particular embodiment provides many of the same functions of the embodiment shown in FIGS. 1 through 4. That is, a rider will grip the standard handlebars 17 when in an upright seated position, will grasp the first auxiliary gripping portions 33 when standing, will grasp the second auxiliary gripping portions 37A when leaning forward and will grasp the third auxiliary gripping portions 42 when in an aerodynamic posture, crouched with the arms fully tucked in.

The selection between the two embodiments depend upon an individual's preference as to the vertical positioning of the second auxiliary gripping portion 37 in FIGS. 1 through 4 and the second auxiliary gripping portion 37A in FIG. 5.

In summary there have been disclosed different embodiments of an improved bicycle handlebar and handlebar attachment that provide additional gripping areas. These gripping areas facilitate the ability of a rider to control the bicycle in an upright seated posture, a standing posture, a forward leaning, seated posture and a crouched, fully tucked aerodynamic posture. These gripping surfaces are provided by tubular or other structures which either secure as ordinary handlebars to a goose neck assembly of a bicycle or constitute an integral extension of an ordinary handlebar. The integral handlebar apparatus or the handlebar attachments increase the utility and comfort of a bicycle rider on an all-terrain bicycle. Finally, the handlebar attachments are easy to install and remove by the manipulation of a simple clamping device.

This invention has been disclosed in terms of certain embodiments. It will be apparent that many modifications can be made to the disclosed apparatus without departing from the invention. For example, each of the figures discloses a gripping portion formed in a substantially straight line. These portions could also be formed with slight curves to fit the hand better. Moreover, the orientations of various gripping portions are defined as general relationships. It will be obvious that, for example, a slight variation could be made by altering a parallel relationship in the disclosure to a nearly parallel relationship in a particular embodiment. Any such change could be made without effecting function of such a modified handlebar. Therefore, it is the intent of the appended claims to cover all such variations and modifications as come within the true spirit and scope of this invention.

What is claimed as new and desired to be secured by Letters Patent of the United States is:

1. A handlebar attachment for connection to a free end of a handlebar on a bicycle that extends along a nominally horizontal axis and includes one grip area for being gripped by a rider's hand, said handlebar attachment comprising:

A) coupling means for connecting said handlebar attachment to the bicycle handlebar, B) a first auxiliary grip portion extending from said coupling means to lie in a plane through the nominally horizontal axis for forming another grip area, C) a second auxiliary grip portion extending in a direction toward the other end of the bicycle handlebar for forming another grip area, D) a third auxiliary grip portion parallel to said first auxiliary grip portion and below the axis for forming another grip area, and E) positioning means for establishing the relative positions of said first, second and third auxiliary grip portions whereby said bicycle handlebar and said handlebar attachment provide a plurality of grip areas that can be gripped by a rider in different rider postures on the bicycle.

2. A handlebar attachment as recited in claim 1 wherein said first auxiliary grip portion extends at an incline angle from said coupling means from greater than 0° to 40° relative to the horizontal.

3. A handlebar attachment as recited in claim 2 wherein said incline angle is between 20° and 40°.

4. A handlebar attachment as recited in claim 3 wherein said incline angle is 30°.

5. A handlebar attachment as recited in claim 2 wherein the bicycle has wheels lying about a common plane and said first auxiliary grip portion lies parallel to the common plane.

6. A handlebar attachment as recited in claim 2 wherein the bicycle has the wheels lying about a common plane and the bicycle handlebar axis is skewed by an angle of 3° to 9° in the horizontal from a normal orientation with respect to the common plane and said first auxiliary grip portion lies parallel to the common plane.

7. A handlebar attachment as recited in claim 1 wherein said positioning means locates said second auxiliary grip portion forward of the bicycle handlebar.

8. A handlebar attachment as recited in claim 7 wherein said positioning means includes means for positioning said second auxiliary grip portion to lie substantially in a plane defined by said handlebar axis and said first auxiliary grip portion.

9. A handlebar attachment as recited in claim 7 wherein said positioning means includes a link for positioning said second auxiliary grip portion below the bicycle handlebar.

10. A handlebar attachment as recited in claim 9 wherein said first auxiliary grip portion extends an incline angle of 20° to 40° and said positioning means positions said second auxiliary grip portion along a line at a corresponding angle below the horizontal.

11. A handlebar attachment as recited in claim 1 wherein the bicycle has wheels lying about a common plane and said positioning means locates said third auxiliary grip portion parallel to the common plane.

12. A handlebar attachment as recited in claim 1 wherein the bicycle has wheels lying about a common plane and wherein said positioning means locates said first and third auxiliary grip portions to be parallel to each other and to the common plane, said first and third auxiliary grip portions extending along parallel inclines, the incline for said first auxiliary grip portion being between 20° and 40° to the horizontal.

13. A handlebar attachment as recited in claim 12 wherein said positioning means locates said second auxiliary grip portion forward of the bicycle handlebar.

14. A handlebar attachment as recited in claim 13 wherein said positioning means includes means for positioning said second auxiliary grip portion to lie substantially in a plane defined by said handlebar axis and said first auxiliary grip portion.

15. A handlebar attachment as recited in claim 13 wherein said positioning means includes means for positioning said second auxiliary grip portion below bicycle handlebar such that said second auxiliary grip portion lies along a line from the axis at a corresponding angle below the horizontal.

16. In a bicycle having front and rear wheels, a frame lying along a common plane for supporting the wheels, steering means for rotating the front wheel for steering and first and second handlebars extending from the steering means for enabling a rider to manipulate the steering means, the improvement wherein each of said handlebars comprises:

A) a central handlebar portion extending from the steering means along an axis and from the common plane for forming a first grip area for being gripped by a rider's hand, B) a first auxiliary grip portion extending from said central handlebar portion in a plane through the nominally horizontal axis for forming another grip area, C) a second auxiliary grip portion extending in a direction substantially parallel to the axis and toward the common plane to a position spaced therefrom for forming another grip area, D) a third auxiliary grip portion parallel to said first portion and below the axis for forming another grip area, and E) positioning means for establishing the relative positions of said first, second and third auxiliary grip portions relative to said central handlebar portion thereby to provide a plurality of grip areas for a rider that can be gripped by a rider in different rider postures on the bicycle.

17. A handlebar as recited in claim 16 wherein said first auxiliary grip portion extends at an incline angle from said coupling means from greater than 0° to 40° relative to the horizontal.

18. A handlebar as recited in claim 17 wherein said incline angle is between 20° and 40°.

19. A handlebar as recited in claim 17 wherein said incline angle is 30°.

20. A handlebar as recited in claim 17 wherein said positioning means locates said auxiliary first grip portion parallel to the common plane.

21. A handlebar as recited in claim 17 wherein said central handlebar portion axis is skewed by an angle of 3° to 9° in the horizontal from a normal orientation with respect to the common plane and said first auxiliary grip portion lies parallel to the common plane.

22. A handlebar as recited in claim 16 wherein said positioning means locates said second auxiliary grip portion forward of the central handlebar portion.

23. A handlebar as recited in claim 22 wherein said positioning means includes means for positioning said second auxiliary grip portion to lie in a plane defined by said central handlebar portion axis and said first auxiliary grip portion.

24. A handlebar as recited in claim 22 wherein said positioning means includes a link for positioning said second auxiliary grip portion below said central handlebar portion.

25. A handlebar as recited in claim 24 wherein said first auxiliary grip portion extends an incline angle of 20° to 40° and said positioning means positions said second auxiliary grip portion along a line at a corresponding angle below the horizontal.

26. A handlebar as recited in claim 16 wherein said positioning means includes means for locating said third auxiliary grip portion parallel to the common plane.

27. A handlebar as recited in claim 16 wherein said first and third auxiliary grip portions are substantially parallel to each other and to the common plane and said first and third auxiliary grip portions extend along parallel inclines, the incline for said first auxiliary grip portion being between 20° and 40° to the horizontal.

28. A handlebar as recited in claim 27 wherein said positioning means locate said second auxiliary grip portion forward of said central handlebar portion.

29. A handlebar as recited in claim 28 wherein said positioning means includes means for positioning said second auxiliary grip portion in a plane defined by said central handlebar portion and said first auxiliary grip portion.

30. A handlebar as recited in claim 28 wherein said positioning means includes means for positioning said second auxiliary grip portion below said central handlebar portion such that said second auxiliary grip portion lies along a line from the axis at a corresponding angle below the horizontal.

* * * * *